United States Patent [19]

Abiven

[11] Patent Number: 5,518,383
[45] Date of Patent: May 21, 1996

[54] REFLECTOR WITH METALLIC MATRIX COMPOSITE SUPPORT AND METHOD OF MANUFACTURING IT

[75] Inventor: Henri Abiven, Oinville, France

[73] Assignee: Aerospatiale Societe Nationale Industrielle, France

[21] Appl. No.: 239,702

[22] Filed: May 9, 1994

[30] Foreign Application Priority Data

May 10, 1993 [FR] France ................... 93 05569

[51] Int. Cl.$^6$ ..................................... B22F 7/02
[52] U.S. Cl. .................. 419/48; 419/5; 419/8; 419/24; 419/35; 419/51
[58] Field of Search ............... 419/5, 8, 24, 35, 419/48, 51; 75/203; 264/255; 350/641

[56] References Cited

U.S. PATENT DOCUMENTS

| | | | |
|---|---|---|---|
| 4,188,358 | 2/1980 | Withoos et al. | 264/255 |
| 4,350,528 | 9/1982 | Engle | 75/203 |
| 4,492,669 | 1/1985 | Gould | 419/5 |
| 4,659,548 | 4/1987 | Gubbay et al. | 419/10 |
| 4,750,827 | 6/1988 | Assus et al. | 350/641 |
| 4,898,711 | 2/1990 | Burt et al. | 419/27 |

FOREIGN PATENT DOCUMENTS

| | | |
|---|---|---|
| 0558991 | 9/1993 | European Pat. Off. . |
| 2008275 | 5/1979 | United Kingdom . |
| 8604297 | 7/1986 | WIPO . |

OTHER PUBLICATIONS

Proceedings of the Spie, vol. 1303, 1990, pp. 554–561.

*Primary Examiner*—Donald P. Walsh
*Assistant Examiner*—John N. Greaves
*Attorney, Agent, or Firm*—Remy J. VanOphem; John VanOphem

[57] ABSTRACT

To manufacture a reflector formed by a reflective metallic layer on a metallic matrix composite support, a metallic layer having a reflective surface whose shape is at least approximately identical to the required geometrical shape is disposed on a mold surface having a geometrical shape complementary to the required geometrical shape of the reflector. Fibers to constitute the composite support are draped on the metallic layer. They are metallized by the metallic or intermetallic material to form the metallic matrix. This layer and the metallized fibers are subjected to temperature and pressure conditions adapted to press the reflective surface strongly against the mold surface and to cause diffusion welding of the layer with the metallized fibers and of the metallized fibers with themselves so as to integrate the layer to the composite support during consolidation of the latter.

22 Claims, 2 Drawing Sheets

REFLECTOR WITH METALLIC MATRIX COMPOSITE SUPPORT AND METHOD OF MANUFACTURING IT

BACKGROUND OF THE INVENTION

1. Field of the Invention

The invention concerns the manufacture of a reflector having a metallic reflective surface adapted to reflect luminous radiation (in which case the expression "optical mirrors" is commonly used) or non-optical radiation (infrared, etc.) and a metallic matrix composite support extending along the surface.

2. Description of the Prior Art

The use of metallic matrix composite materials for dimensionally stable structures such as optical supports, for example, is well known. These materials have advantages including the following:

the materials are sealed, so that there is no absorption or desorption of moisture, which is beneficial in applications such as space applications where desorption could cause unwanted deformations (or even pollution of sensors); and the materials are thermally conductive, in particular in the direction of their thickness, which greatly facilitates achieving thermal equilibrium of the structure.

These two properties, combined with the fact that the mechanical performance (stiffness and strength) and the coefficients of thermal expansion are beneficial, mean that metallic matrix composites (especially those using light alloys such as aluminum, aluminum alloys, magnesium and magnesium alloys, or copper and copper alloys, which are advantageous because of their thermal conductivity and their ability to withstand high temperatures), and intermetallic matrix composites (including titanium aluminide and nickel aluminide which are advantageous because of their high temperature resistance) are particularly suitable for use in all structures requiring high dimensional stability, such as space telescopes or terrestrial telescopes, for example.

The reflective surface, whether metallic or otherwise, is conventionally fitted to its support by gluing it or by electrolytic deposition subsequent to fabrication of the support, for example.

See for example the article by SULTANA and FORMAN of MIT, Lincoln Lab., Lexington, Mass., USA, entitled "Dimensional stability concerns in the manufacture of graphite/epoxy beam steering mirrors", published in Proceedings of SPIE—The International Society for Optical Engineering, Conference held at San Diego, Calif., USA, 12–13 Jul. 1990—which proposes a laser cavity mirror for space radar including a graphite/epoxy matrix to which an aluminum coating is glued at ambient temperature using an epoxy adhesive.

See also the article by WENDT and MISRA, of MARTIN-MARIETTA ASTRONAUTICS GROUP, DENVER, Colo., USA, entitled "Fabrication of near-net shape graphite-magnesium composite for large mirrors" published in Advances in optical structure systems; Proceedings of the Meeting, Orlando, Fla., Apr. 16–19, 1990 (A91-36651 15-74), Ballingham, Wash., Society of Photo-Optical Instrumentation Engineers, 1990, pp 554–561, which concerns the fabrication of large stable mirrors for space surveillance systems and laser systems including a carbon/magnesium composite support onto which a 127 µm copper layer is deposited.

The disadvantages of attaching the reflective surface to a support already formed include:

the interface between the support and the reflective surface constitutes a discontinuity in the direction of the thickness of the reflector which can lead to at least localized separation in the event of thermal cycling, for example, or which can degrade the dimensional stability of the support (absorption-desorption in the case of a glue, play in the case of mechanical couplings, etc.);

the geometry of the reflective surface is determined by the geometry of the support and the quality of the process used for attaching the reflective surface, which almost always requires subsequent machining of the surface to meet the shape requirement; and the mass and the cost of the reflector are higher.

An object of the invention is to alleviate the above drawbacks.

The basic idea of the invention is to determine the geometry of the active surface (free surface) of the reflective surface directly and to ensure the greatest possible continuity within the thickness of the reflector between the reflective surface and its support.

SUMMARY OF THE INVENTION

The invention resides in a method of manufacturing a reflector formed by a reflective metallic layer on a metallic matrix composite support, wherein:

a metallic layer having a reflective surface whose shape is at least approximately identical to the required geometrical shape is disposed on a mold surface having a geometrical shape complementary to the required geometrical shape of the reflector;

fibers adapted to constitute the composite support are draped on the metallic layer, the fibers being metallized by the metallic or intermetallic material adapted to form the metallic matrix; and the layer and the metallized fibers are subjected to temperature and pressure conditions adapted to press the reflective surface strongly against the mold surface and to cause diffusion welding of the layer with the metallized fibers and of the metallized fibers with themselves so as to integrate the layer to the composite support during consolidation of the support.

According to preferred features of the invention, some of which may be combinable with others:

the fibers are carbon or graphite fibers;

the fibers are disposed symmetrically on either side of a median surface of symmetry;

the fibers are draped onto the metallic layer in the free state relative to each other;

the fibers are divided into an even number of layers disposed symmetrically to either side of a median surface of symmetry;

the metallized fibers are prepared by vapor phase physical deposition of a layer of metallization onto the fibers so that the metallized fibers are flexible;

the fibers are stranded, rather than free;

the stranded metallized fibers are metallized by dipping into a bath of molten metallic material or by infiltration;

in an alternative embodiment, the fibers are grouped in plates in which the fibers have one, two or three alignment directions;

the plates of metallized fibers having one, two or three alignment directions are obtained by infiltration of the metallic material in the molten state under pressure;

the metallic or intermetallic metallization material is selected from the group of aluminum, aluminum alloy, magnesium, magnesium alloy, copper, copper alloy, titanium, titanium alloy and aluminides, in particular titanium aluminide and nickel aluminide;

the metallic layer is placed on the mold surface in the form of one or more deformable films;

the metallic layer is obtained by preparation of a metallic blank having a blank surface at least approximately identical to the required geometrical shape, the blank being deformable under the temperature and pressure conditions at least in a part of its thickness underlying the blank surface, the blank is deformable under the temperature and pressure conditions throughout its thickness;

the metallic blank includes a rigid base layer and a coating layer formed of a material that is deformable under the temperature and pressure conditions;

the coating layer is obtained by plasma spraying of one or more metallic powders onto the rigid base layer;

the metallic layer is applied to the surface of the mold by plasma spraying of one or more metallic powders;

the metallic layer includes one or more metallic materials selected from the group of aluminum, aluminum alloy, magnesium, magnesium alloy, copper, copper alloy, nickel, nickel alloy, titanium, titanium alloy and aluminides, in particular titanium aluminide and nickel aluminide;

the reflector is polished;

a further coating is applied to the reflective layer;

the further coating is preferably of gold, applied by vacuum deposition or chemically; and an oxidation protection layer is deposited on the fibers on the opposite side to the metallic layer.

The invention enables fabrication of a metallic matrix composite material reflector whose reflective layer, on completion of consolidation of the metallized fibers:

conforms to the specified shape (without subsequent machining, but possibly with simple polishing); and is metallurgically attached by diffusion welding to the remainder of the structure (without gluing), enabling the use of materials with coefficients of thermal expansion and Young's moduli substantially different from those of the composite.

To obtain the specified shape the proposed solution is to place on the previously machined and polished mold coated with a mold release agent of an appropriate known type a deformable (conformable . . . ) metallic layer that can be diffusion welded to the remainder of the structure under the conditions of consolidation of the metallized fibers. This deformable metallic layer can be:

a plasma sprayed deposit of metallic powder applied directly to the mold, the nature of the metal being such that it can be diffusion welded to the remainder of the structure;

a metallic blank preformed conventionally to dimensions approximating the specified shape, the material of which is deformable plastically or superplastically and can be diffusion welded to the remainder of the structure under the conditions of consolidation of the metallized fibers; or a plasma sprayed deposit of metallic powder on the external surface (that adapted to face the mold) of a metallic blank conventionally preformed to dimensions approximating the specified shape, the material of which cannot be deformed plastically under the conditions of consolidation of the metallized fibers; the sprayed metallic powder must be diffusion weldable to the metallic blank during consolidation; likewise the metallic blank and the metallic matrix must be diffusion weldable (in the present instance, the "plasma deposit+ preformed blank" combination is placed on the mold, with the "plasma deposit" against the mold).

The invention also resides in a reflector obtained by this method, that is to say a reflector formed by a reflective metallic layer extending over a metallic or intermetallic matrix composite support wherein the metallic or intermetallic matrices of the support and the reflective layer are intermingled.

According to other preferred features of the invention, some of which may be combinable with others:

the metallic or intermetallic materials of the support and the reflective layer are different and their concentrations vary continuously in the direction from the support to the reflective layer and vice versa; alternatively, these metallic materials are identical;

the support is symmetrical about a median surface of symmetry;

the support includes superposed layers of fibers with different orientations in adjacent layers;

the fibers are carbon fibers;

the metallic matrix is formed from one or more materials selected from the group of aluminum, aluminum alloy, magnesium, magnesium alloy, copper, copper alloy, titanium, titanium alloy and aluminides, in particular titanium aluminide and nickel aluminide;

the reflective metallic layer is formed from one or more materials selected from the group of aluminum, aluminum alloy, magnesium, magnesium alloy, copper, copper alloy, nickel, nickel alloy, titanium, titanium alloy and aluminides, in particular titanium aluminide and nickel aluminide;

the matrix has an oxidation protection layer on the side opposite the metallic layer.

Objects, features and advantages of the invention emerge from the following description given by way of non-limiting example with reference to the appended drawings.

DETAILED DESCRIPTION OF THE PREFERRED EMBODIMENT

Figure 1:
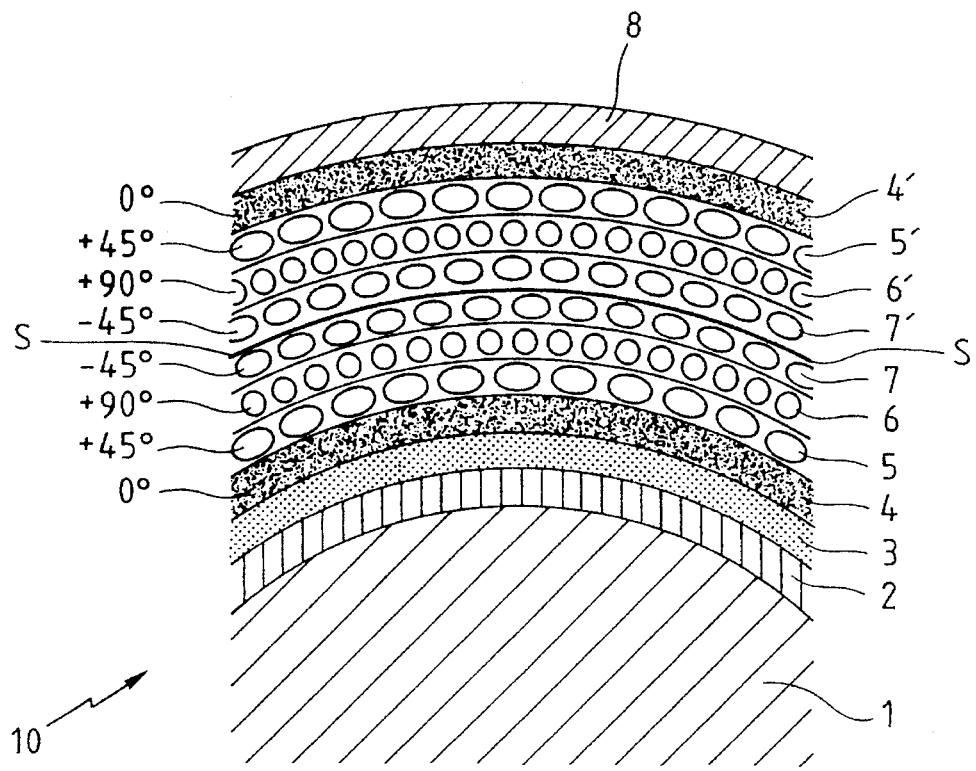
FIG. 1 is a diagrammatic transverse section of a stack of layers produced during the production of a concave first reflector.

Each figure shows the production by diffusion welding of a reflector having a metallic reflective surface extending over a metallic or intermetallic matrix composite support of large size but small thickness, preferably long fibers, although this is not mandatory.

One skilled in the art knows that it is not necessarily possible to diffusion weld any given metal or alloy to any other given metal or alloy: some combinations even give rise to violent reactions under certain conditions of temperature and pressure; consequently, any incompatible metallic elements are separated by one or more intermediate metallic elements each compatible with both adjoining metallic elements. Also, great care is exercised to avoid the creation of eutectics.

The manufacture of the reflector requires a mold whose geometry is that required for the external surface of the reflective surface. The metallic (aluminum, nickel, copper, etc.) elements to constitute the reflective surface are disposed on the mold previously coated with mold release agent; metallized fibers; and preferably long fibers with a length of several centimeters (or even several tens of centimeters) are then disposed over the metallic elements to constitute the reflective surface; during one and the same diffusion welding operation (the pressure, temperature and time of which depend on the metals used) the various metallic elements are compacted and bonded together by diffusion into each other and the remainder of the composite; on removal from the mold the reflector as a whole has a surface polish dependent on that of the mold. If the polish of the reflective surface obtained is insufficient, additional polishing can be carried out and conventional surface coatings (Cr, Au, etc.) can be applied; the thickness of these conventional coatings (typically 300 Å) is very much less than that of the reflective surface. The metallic elements can be applied to the surface of the mold by any appropriate known deposition technique such as plasma thermal spraying, for example. In the case of plane surfaces or surfaces that can be developed, the metallic elements to constitute the reflective surface can be applied in the form of a plastically deformable metallic film or strip placed on the mold previously coated with mold release agent. As previously, the film or tape is bonded by diffusion welding to the constituents of the composite. After removal from the mold, if the polish of the reflective surface is insufficient, the external surface can be polished. As an alternative, the metallic elements can be applied by deposition onto a base metallic layer also formed of all or part of the metallic elements on a surface of the base layer having at least approximately the geometrical shape required for the reflective surface; this base layer is then placed on the surface of the mold, the coated surface facing the mold surface. The exact conformance to the required geometry of the reflective surface obtained in this way then results, as in the previously mentioned case of film or strips, from plastic deformation of the coating, or even of the base layer, under conditions of temperature and pressure enabling consolidation/diffusion welding so as to mate intimately with the surface of the mold.

It is important to note that, according to the invention, the reflective surface is formed at the same time as its support, to which it is intimately bonded (there is interdiffusion of atoms and therefore metallurgical continuity in the direction of the thickness of the reflector).

A typical example of the manufacture of a mirror according to the present invention is given below:

1. polishing of the external surface of the mold;
2. coating of the mold with a mold release agent;
3. deposition onto the coated mold of the metallic elements of the reflective surface (as just mentioned, there are other methods than deposition for applying the metallic elements);
4. draping onto the mold, covered with the metallic elements, of metallized "pre-impregnated members", this draping being preferably such that there is a central surface of symmetry of the composite (this surface, even if the required reflector is convex, concave or a combination of the two, is at least locally an approximately plane surface, all the more so in that the radius of curvature of the reflector is in practice very much greater than its thickness);
5. application of the hot consolidation cycle to the draped form resulting from operation 4: maximal temperature typically between 400° C. and 650° C., pressure typically between 5 MPa and 300 MPa, duration between 15 minutes and 3 hours for light alloy matrices; for intermetallic matrices the parameters are more like 900° C. to 1200° C. at a pressure of 200 MPa for 30 minutes to one hour (the actual values to be used depend on the consolidated matrix and the metallic elements used);
6. removal from the mold and cleaning of the reflective surface; and
7. where applicable: additional polishing and further coating.

The metallized "pre-impregnated members" mentioned above can be of various sorts, their main property being that they are diffusion welded:

metallized carbon fibers, produced for example by metallizing carbon filaments by vapor phase physical deposition;

stranded carbon fibers metallized by dipping into the molten alloy; and 1D, 2D or 3D plates of carbon fibers metallized by infiltration of the molten alloy.

With reference to the matrices, in theory any metal can be used in the present invention. Nevertheless, and given their density in particular, aluminum, aluminum alloy, magnesium and magnesium alloy are obviously preferable matrices for aerospace applications. Likewise, if the ability to withstand temperatures above 400° C. is required, a copper or copper alloy matrix can be advantageous, given its good thermal conductivity. If there is a requirement to withstand temperatures of 800° C. to 1000° C., nickel and/or titanium aluminide matrices are preferable.

With reference to the fibers, they are preferably carbon fibers; the most advantageous are those having a very high modulus, a very high tensile strength and the most negative possible coefficient of thermal expansion combined with a high thermal conductivity. Fibers based on pitch, for example TONEN FT 700 fibers, are particularly advantageous; the specifications of FT 700 fibers are as follows:

| - density | 2.16 g/cm$^3$ |
| - tensile strength | 3 300 MPa |
| - Young's modulus | 700 GPa |
| - diameter | 10 μM |
| - number of filaments per wick | 3 000 (3 K) |
| - coefficient of thermal expansion $\alpha_L$ | $-1.5 \cdot 10^{-6} \text{K}^{-1}$ |

As an alternative, the fibers are silicon carbide or alumina fibers.

EXAMPLES a) First example (see FIG. 1)

A9 type aluminum powder (99.9% pure) was deposited by plasma spraying onto a polished molybdenum convex mold 1 coated with boron nitride (mold release agent 2).

Onto this 120 μm thick deposit 3 were draped quasi-isotropically (0°, +45°, +90°, −45°, −45°, +90°, +45°, 0°) layers 4 through 7 and 7' through 4' of FT 700 carbon fibers with a very high Young's modulus previously metallized by vapor phase physical deposition of pure (A5) aluminum (the vapor phase physical deposition process being directional, the FT 700 wicks were first spread by blowing with air, in practice transversely (hairdryer type)) to facilitate the metallization of each filament; a 100 μm thick pure (A5) aluminum film 8 was then applied. The resulting assembly was consolidated at raised temperature (595° C.) and under pressure (25 MPa) with the maximum pressure and temperature maintained for 25 minutes, and in a vacuum of $10^{-2}$ Torr. The composite was produced by diffusion welding and the layer 3 was integral with it. The aluminum matrix composite material mirror 10 removed from the mold had an aluminum surface coating with a polish dependent on that of the molybdenum mold (if the polish is insufficient the surface can be polished).

The number of layers of fibers is in practice very much greater than the eight layers shown in FIG. 1 as their unit thickness is in the order of ten microns and the thickness required for the support is typically in the order of a few millimeters.

The advantage of the aluminum layer 8 of similar thickness to the active layer 3 is that it provides protection and guarantees symmetry relative to its median plane, the advantage of which is that it avoids deformation on cooling after consolidation.

Note that the quasi-isotropic draping involves changing the orientation of the layers of fibers by 45° between layers; the stacking of the layers produces a median surface of symmetry S to either side of which the layers are oriented symmetrically: the advantage of this is that it avoids deformation on cooling.

Figure 2:
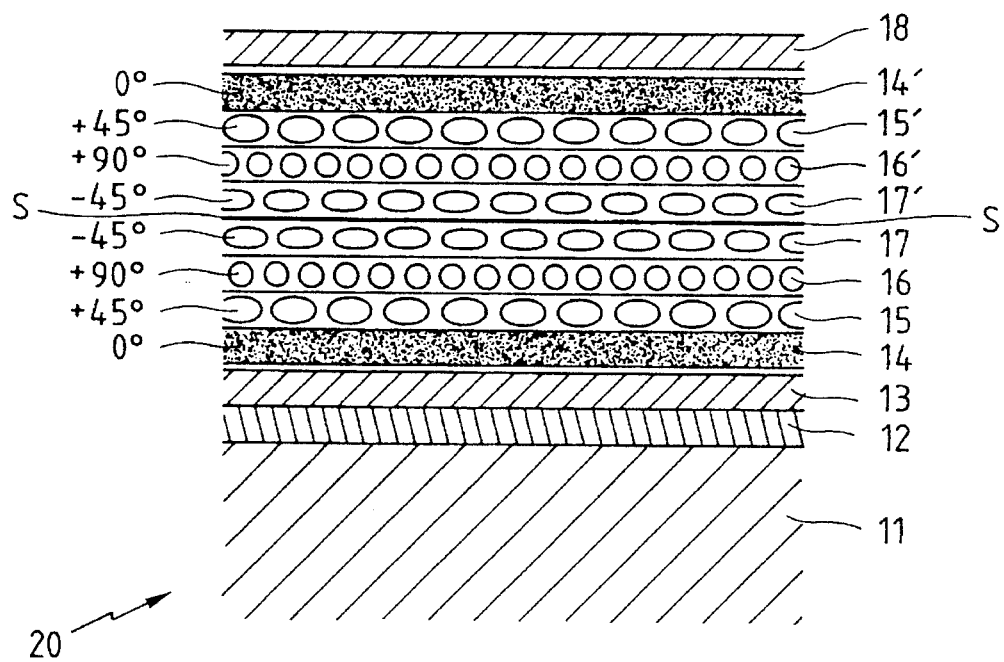
FIG. 2 is a diagrammatic transverse section of another stack of layers produced during the manufacture of a plane second reflector.

The following specifications were obtained with a quasi-isotropic plane plate 200 mm×200 mm×2.8 mm with a fiber ratio (the mass ratio of bare fibers to the same fibers after metallization) of 50% carried out under the same conditions:

| | |
|---|---|
| - Young's modulus E | 133 GPa |
| - coefficient of thermal expansion $\alpha_L$ | $2.65 \times 10^{-6°}$ C.$^{-1}$ |
| - transverse thermal conductivity $K_T$ | 152 W.m$^{-1°}$ C.$^{-1}$ |
| - density ρ | 2.4 g/cm$^3$ | b) Second example (see FIG. 2)

A 120 μm thick superplastic 7475 aluminum film 13 was placed on a refractory stainless steel mold 11 coated with boron nitride mold release agent 12 so that it adopted approximately the final required shape. Layers 14 through 17 and 17' through 14' of FT 700 carbon fibers with a very high Young's modulus metallized with A5 aluminum were draped quasi-isotropically on this film. A 100 μm thick A5 aluminum film 18 was placed on this draped subassembly. The resulting assembly was consolidated as in the first example. After diffusion welding of the assembly the part was removed from the mold and the superplastic aluminum active surface 13 had deformed to assume the exact shape of the mold, producing a mirror 20 having a central plane of symmetry S. A mirror made in this manner can be given a final polish and an additional 300 Å coating of gold can be deposited in vacuum or chemically.

Figure 3:
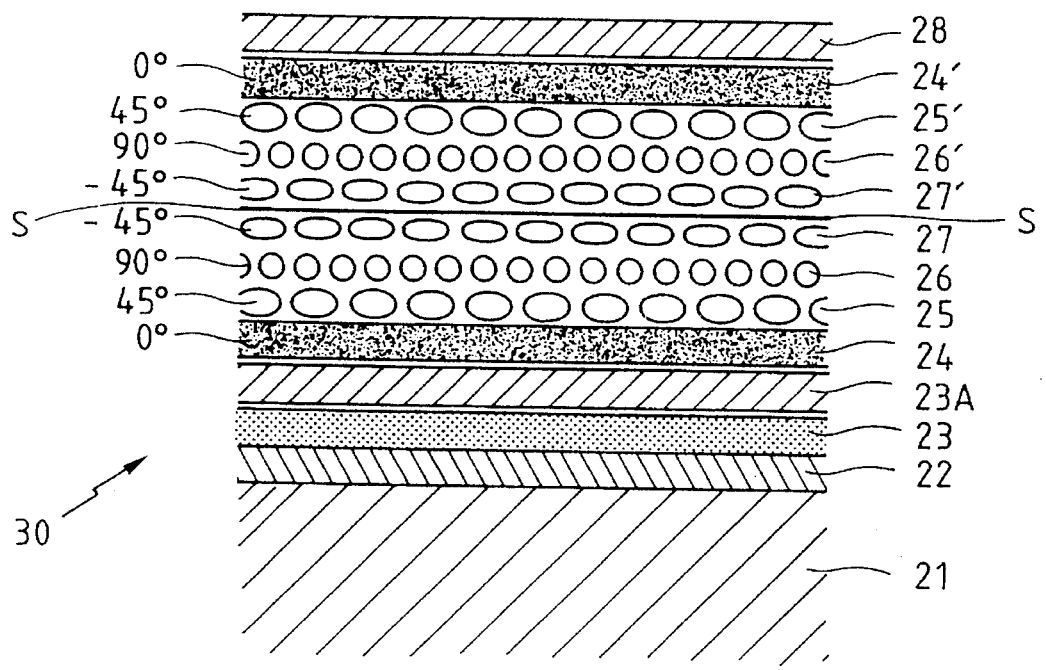
FIG. 3 is a diagrammatic transverse section of a plane third reflector.

The specifications obtained were similar to those of the first example.

c) Third example (see FIG. 3)

A9 aluminum powder was plasma sprayed onto a polished molybdenum plane mold 21 coated with boron nitride mold release agent 22. A 10 μm thick film of T 40 titanium 23A was placed on the resulting 100 μm thick deposit 23. Layers 24 through 27 and 27' through 24' of FT 700 carbon fibers having a very high Young's modulus metallized with GA6Z1 magnesium alloy by vapor phase physical deposition were draped quasi-isotropically onto this film 23A. A film 28 of the same kind as the layer 23A, i.e. a 10 μm thick film of T 40 titanium, was placed on this draped subassembly. The resulting assembly was consolidated as follows:

| | |
|---|---|
| - maximal temperature | 490° C. |
| - pressure | 25 MPa |
| - vacuum | $10^{-2}$ Torr |
| - duration | 30 minutes |

The composite was formed by diffusion welding in which the layer 23 and the layer 23A interpenetrate and the layer 23A and the composite interpenetrate. After removal from the mold the magnesium matrix composite material mirror 30 had an aluminum surface coating with a polish dependent on that of the molybdenum mold. The titanium layer 23A served as a barrier between the aluminum and the magnesium which, otherwise in contact, would have formed a eutectic. The titanium film 28 protected the magnesium from oxidation.

The following specifications were obtained with a quasi-isotropic plane plate 200 mm×200 mm×2.8 mm with a fiber ratio of 50%:

| | |
|---|---|
| - E | 127 GPa |
| - $\alpha_L$ | $2.10 \times 10^{-6°}$ C.$^{-1}$ |
| - $K_T$ | 88 W.m$^{-1°}$ C.$^{-1}$ |
| - ρ | 2 g/cm$^3$ |

Figure 4:
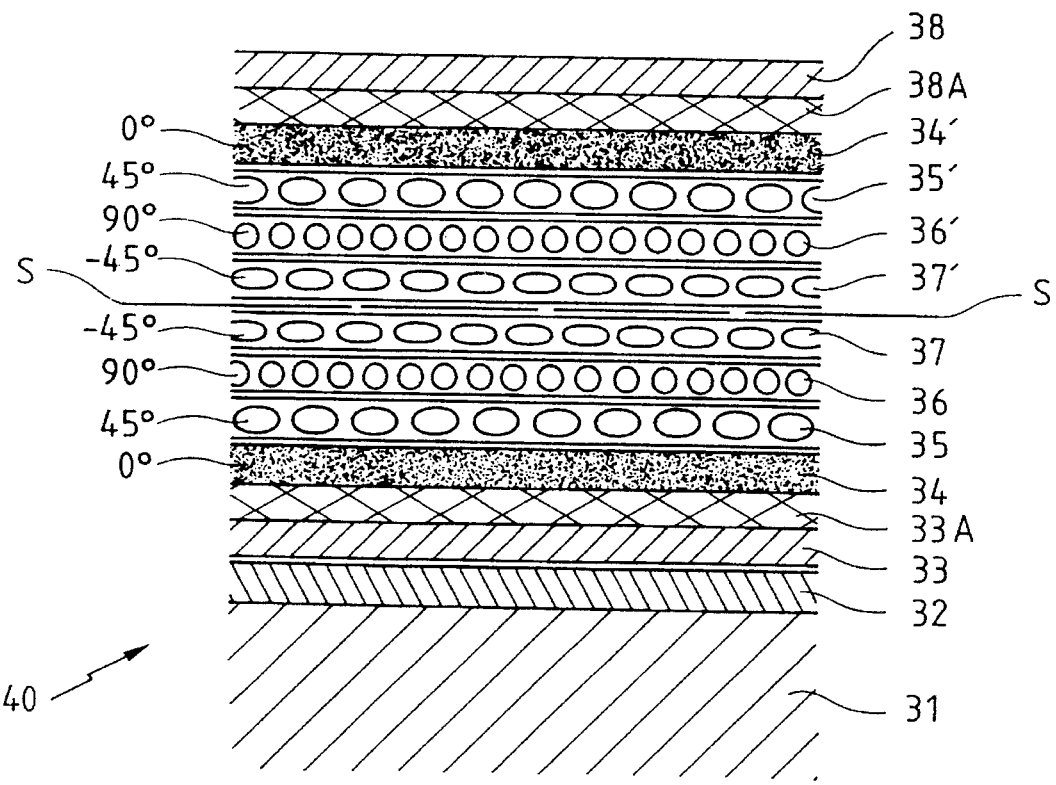
FIG. 4 is a diagrammatic transverse section of a plane fourth reflector.

As an alternative the deposit 23 can be applied to the film 23A before it is placed in contact with the surface of the mold.

d) Fourth example (see FIG. 4)

A 100 μm thick superplastic 7475 aluminum film 33 and then a 10 μm thick film 33A of pure (T 40) titanium were placed on a refractory stainless steel mold 31 coated with boron nitride mold release agent 32. Eight unidirectional plates 34 through 37 and 37' through 34' 0.5 mm thick with a single fiber alignment direction formed from FT 700 carbon fibers metallized by low pressure infiltration of AZ 61 magnesium into the carbon wicks were then stacked; these plates were placed so that the fibers constituted a quasi-isotropic reinforcement. Onto this stack were placed a 10 μm thick film 38A of T 40 titanium and then a 100 μm thick film 38 of superplastic 7475 aluminum. This combination was consolidated as in example c). After removal from the mold the aluminum active surface (that towards the mold) had assumed the shape of the mold surface, yielding a mirror 40 having a central plane of symmetry S.

The specifications obtained were of the same order of magnitude as those for example c).

e) Fifth example (no diagram)

For mirrors requiring high stiffness, the mirrors described above can be used as bases for sandwich constructions using an aluminum honeycomb core, for example, the bases being bonded to the core using thermally conductive glue or, preferably, by low-temperature brazing, the type of brazing depending on the nature of the elements to be assembled.

The various examples given above have the common feature of each corresponding to a mirror of great dimensional stability embodying carbon fibers in a metallic or intermetallic matrix (aluminum, aluminum alloy, magnesium, magnesium alloy, copper or copper alloy). The mirror is constructed by diffusion welding layers of metallized carbon fibers, stranded metallized carbon fibers or plates of pre-impregnated carbon fibers with a central plane of symmetry and the reflective metallic coating is integrated with the support by diffusion welding during consolidation of the composite, diffusion towards the mold being inhibited by a mold release agent. Thus a single operation produces a mirror having a metallic reflective surface whose polish depends on that of the mold and whose dimensional stability properties are excellent: modulus, strength, coefficient of thermal expansion, transverse thermal conductivity, absence of moisture absorption. If required, the external coating can be polished, after removal from the mold, and receive further conventional coatings (Cr, Au, etc).

The above description is obviously given by way of non-limiting example only and numerous variants can be put forward by one skilled in the art without departing from the scope of the invention.

There is claimed:

1. A method of manufacturing a reflector formed by a reflective metallic layer on a metallic matrix composite support, said method comprising the steps of:

selecting a metallic layer having a reflective surface whose shape is at least substantially conforming to a required geometrical shape of said reflector, said metallic layer being disposed on a mold surface having a geometrical shape complementary to said required geometrical shape;

placing fibers adapted to constitute said composite support on said metallic layer, said fibers constituting a fiber layer having a first side and an opposing second side, said fiber layer being metallized by a metallic or intermetallic material adapted to form said metallic matrix; and subjecting said metallic layer and said metallized fibers to temperature and pressure conditions adapted to press said reflective surface strongly against said mold surface and to cause diffusion welding of said metallic layer with said first side of said fiber layer of said metallized fibers and of said metallized fibers with themselves within said fiber layer so as to integrate said metallic layer to said composite support during consolidation of said composite support.

2. A manufacturing method according to claim 1 further comprising the step of selecting carbon fibers as said fibers.

3. A manufacturing method according to claim 1 further comprising the step of symmetrically disposing said fibers on either side of a median surface of symmetry.

4. A manufacturing method according to claim 1 further comprising the step of placing said fibers in a random free state.

5. A manufacturing method according to claim 4 further comprising the step of dividing said fibers into an equal number of layers disposed symmetrically to either side of a median surface of symmetry.

6. A manufacturing method according to claim 1 further comprising the step of preparing said metallized fibers by vapor phase physical deposition of a layer of metallization onto said fibers so that said metallized fibers are flexible.

7. A manufacturing method according to claim 1 further comprising the step of selecting stranded fibers as said fibers.

8. A manufacturing method according to claim 7 further comprising the step of metallizing said stranded fibers by dipping said stranded fibers into a bath of molten metallic material.

9. A manufacturing method according to claim 1 further comprising the step of grouping said fibers in plates wherein said fibers have one, two or three alignment directions.

10. A manufacturing method according to claim 9 further comprising the step of metallizing said plates of fibers having one, two or three alignment directions by infiltration of said metallic material in a molten state under pressure.

11. A manufacturing method according to claim 1 including the step of selecting said metallized metallic and intermetallic material from a group consisting of aluminum, aluminum alloy, magnesium, magnesium alloy, copper, copper alloy, titanium, titanium alloy and aluminides, in particular titanium aluminide and nickel aluminide.

12. A manufacturing method according to claim 1 further comprising the step of placing said metallic layer on said mold surface in the form of one or more deformable films.

13. A manufacturing method according to claim 1 further comprising the step of obtaining said metallic layer by preparation of a metallic blank having a blank surface area at least approximately identical to the required geometrical shape, said metallic blank being deformable under said temperature and pressure conditions at least in the direction of the thickness of said metallic blank.

14. A manufacturing method according to claim 13 further comprising the step of selecting said metallic blank such that said metallic blank is deformable under said temperature and pressure conditions throughout said thickness.

15. A manufacturing method according to claim 13 further comprising the step of selecting said metallic blank to include a rigid base layer and a coating layer formed from a material that is deformable under said temperature and pressure conditions.

16. A manufacturing method according to claim 15 further comprising the step of plasma spraying one or more metallic powders onto said rigid base layer to form said coating layer.

17. A manufacturing method according to claim 1 further comprising the step of applying said metallic layer to said mold surface by plasma spraying of one or more metallic powders.

18. A manufacturing method according to claim 1 further comprising the step of selecting one or more metallic materials from a group consisting of aluminum, aluminum alloy, magnesium, magnesium alloy, copper, copper alloy, nickel, nickel alloy, titanium, titanium alloy and aluminides, in particular titanium aluminide and nickel aluminide to form said metallic layer.

19. A manufacturing method according to claim 1 further comprising the step of polishing said reflector.

20. A manufacturing method according to claim 1 further comprising the step of applying a coating to said reflective metallic layer.

21. A manufacturing method according to claim 20 wherein said coating applied in said applying step is gold.

22. A manufacturing method according to claim 1 further comprising the step of depositing an oxidation protection layer on said second side of said fiber layer.

* * * * *